(12) United States Patent
Dwyer

(10) Patent No.: US 6,186,867 B1
(45) Date of Patent: *Feb. 13, 2001

(54) METHOD FOR MANUFACTURING PRECISELY SHAPED PARTS

(75) Inventor: James P. Dwyer, Guilford, CT (US)

(73) Assignee: United Technologies Corporation, Hartford, CT (US)

(*) Notice: Under 35 U.S.C. 154(b), the term of this patent shall be extended for 0 days.

This patent is subject to a terminal disclaimer.

(21) Appl. No.: 09/422,405

(22) Filed: Oct. 21, 1999

Related U.S. Application Data

(60) Continuation of application No. 08/933,073, filed on Dec. 18, 1997, now Pat. No. 6,017,263, which is a division of application No. 08/641,251, filed on Apr. 30, 1996, now Pat. No. 5,869,194, and a division of application No. 08/640,045, filed on Apr. 30, 1996.

(51) Int. Cl.7 ....................................................... B24B 41/06
(52) U.S. Cl. ............................ 451/28; 451/365; 451/403; 269/296
(58) Field of Search ............................... 451/28, 365, 369, 451/403, 54; 29/156.8 B; 269/296, 297, 298, 300, 301

(56) References Cited

U.S. PATENT DOCUMENTS

| 3,818,646 | * | 6/1974 | Peterson | 51/217 R |
| 6,017,263 | * | 1/2000 | Dwyer | 451/28 |

* cited by examiner

Primary Examiner—Eileen P. Morgan

(57) ABSTRACT

A method for forming a precisely shaped part includes providing a blank having at least two spaced apart locators, providing a fixture having a U-shaped base with two spaced apart end walls, one supporting a clamping mechanism and the other supporting an abutment, securing the blank into the fixture such that the clamping mechanism mates with one of the locators and forces another of the locators into contact with the abutment, and subsequently machining the blank. The locators on the blank are shaped to mate with corresponding features on the fixture, such that the fixture uses the locators to secure the blank. The locators are disposed in a plane from which critical design features are referenced. Once the blank is clamped into the fixture details can be accurately machined into the blank forming a precisely shaped part.

10 Claims, 7 Drawing Sheets

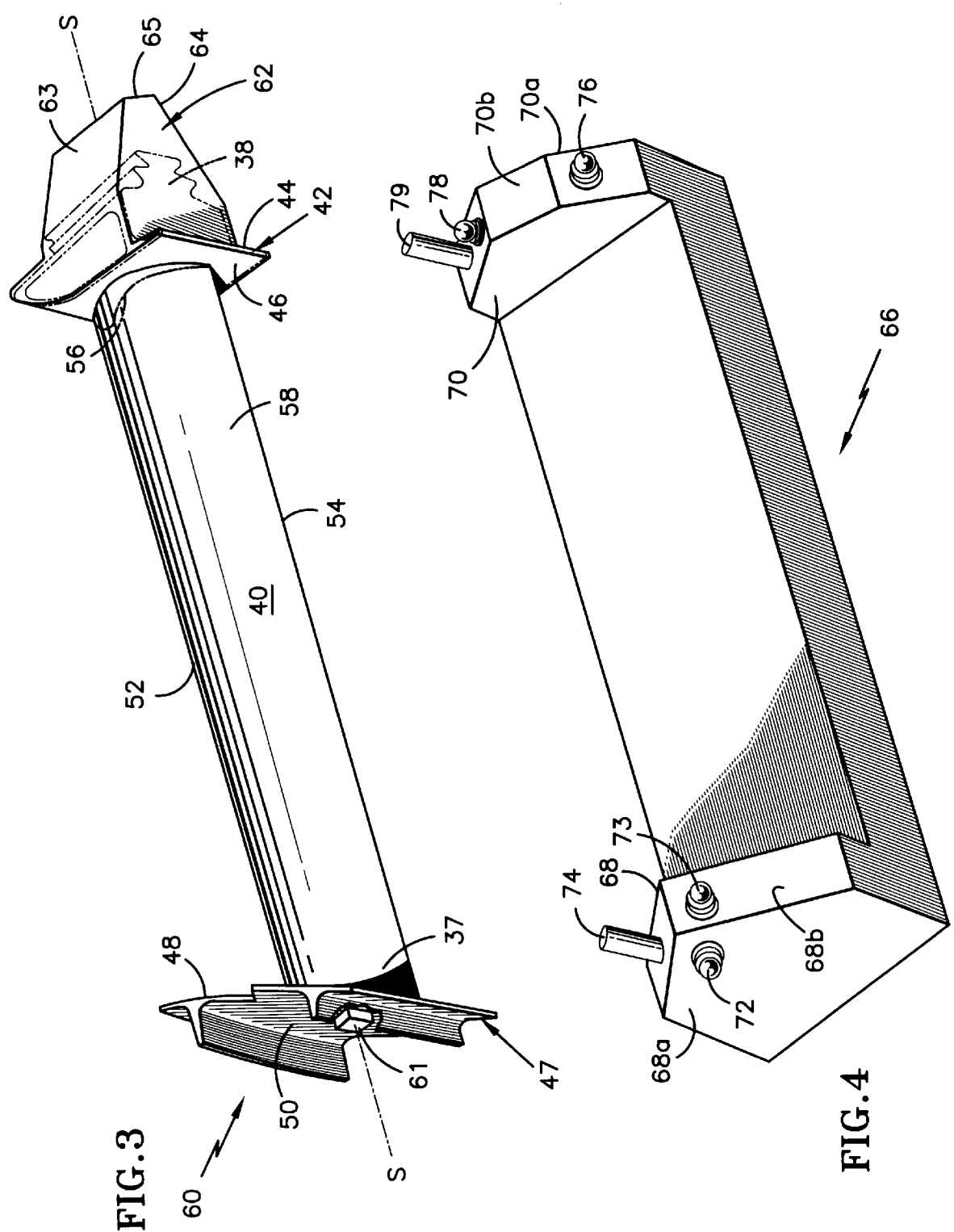

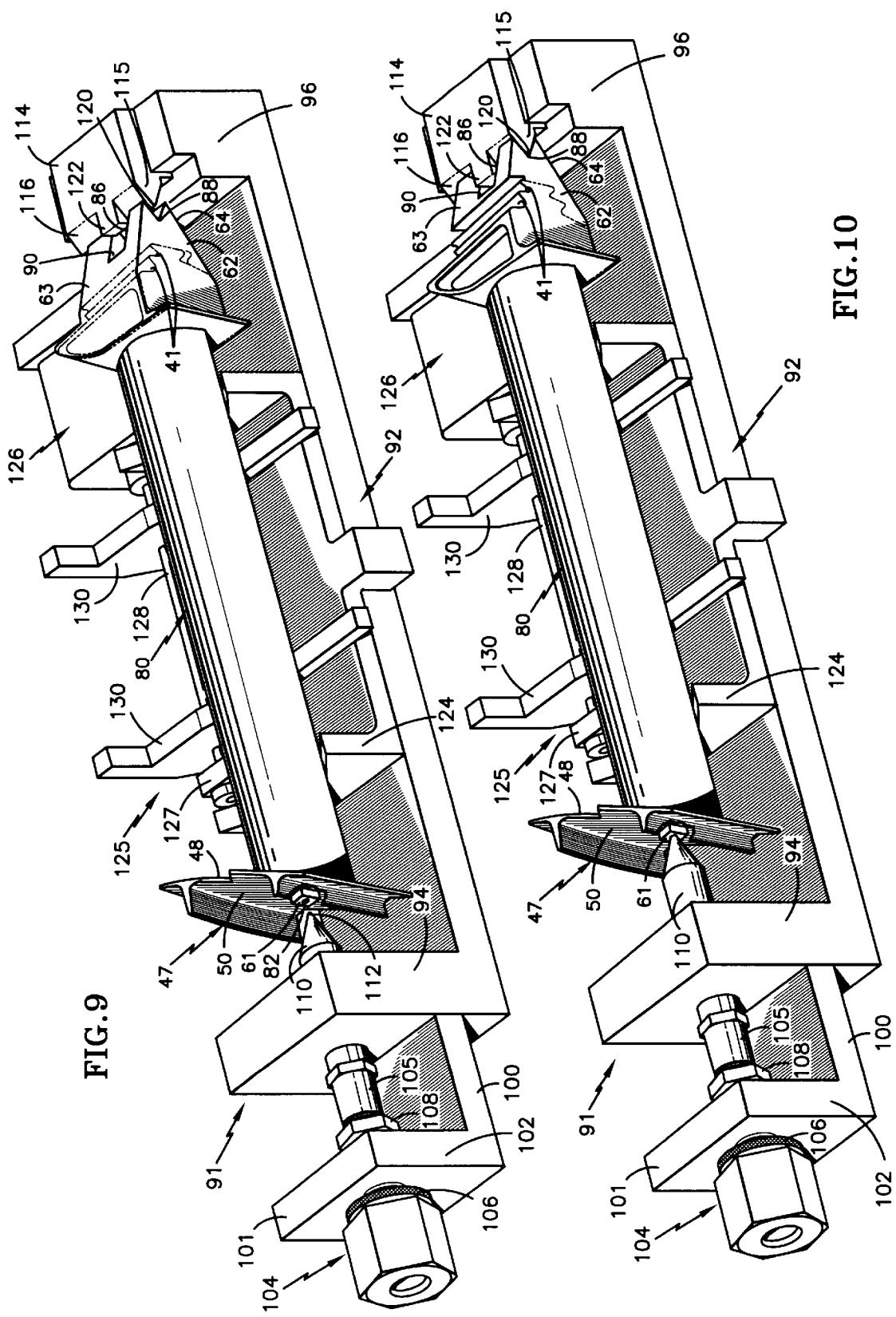

METHOD FOR MANUFACTURING PRECISELY SHAPED PARTS

This application is a continuation of application Ser. No. 08/993,073, filed Dec. 18, 1997, now U.S. Pat. No. 6,017, 263 which in turn is a divisional of aplication Ser. No. 08/641,251, U.S. Pat. No. 5,869,194 and Ser. No. 08/640, 045 filed Apr. 30, 1996 pending.

TECHNICAL FIELD

The present invention relates to precisely shaped parts, and more particularly to a method for manufacturing precisely shaped parts.

BACKGROUND OF THE INVENTION

Many industries use precisely shaped parts. For example, conventional blades for use in gas turbine engines must be precisely shaped. Typically, precision investment casting or die-forging forms a metal starting blank into a blank having a blade shape.

Generally, the blank includes a tip, a root region longitudinally spaced therefrom, and a midspan region extending between the tip and the root region. A platform typically separates the root region from the midspan region. The tip may include an attached or integral shroud. A number of details must be machined into these portions of the blank, to put the precisely shaped part is in its final configuration. For example, a plurality of dove tails must be machined into the root region. These dove tails allow the blade to be secured to the rotor disk in the engine. In order to achieve acceptable engine performance, these dove tails must be formed within small tolerances. To machine the dove tails into the blank with the necessary accuracy, there must be references from which to measure the configuration of the dove tails. The references used, dictate the type of fixture that will be used to hold the blank during machining.

Various methods for providing such references and holding the blank have been suggested. The references may be provided as taught in U.S. Pat. No. 2,577,747 issued to Gibian. Gibian teaches forging at least two hemispherical buttons or protrusions into the blank. Both buttons are disposed on the blank along the stacking axis. Using these buttons, the root region can be ground down to a predetermined thickness, and a bore can be drilled into the opposite end of the blank. Using a lathe as the fixture, the blank is held by clamping the root region and using a pin to engage the bore. The leading and trailing edges of the blank are machined using the thickness of the root region and the bore as references.

The most significant problem with the solution taught in Gibian, is that machining the bore and the thickness of root region based on the buttons does not provide sufficiently accurate results. Another problem is that the root region of the blank cannot be machined while being held in the lathe.

References and fixturing may also be provided as taught in U.S. Pat. No. 3,818,646 issued to Peterson. Peterson teaches a locating button on the root portion of the blade disposed along a design axis of the blank, such as the stacking axis. A fixture utilizes this button as a reference. While in the fixture, datum planes may be ground or machined into the root and shroud portions of the blank to define accurately located surfaces for subsequent machining.

One problem with this solution is that the fixture employs clamping mechanisms that clamp the blank along the airfoil-shaped midspan. As a result, the fixtures are complex and therefore expensive to design, manufacture and maintain. Furthermore, clamping along the midspan makes the fixture dependent on the size and shape of the blade. Due to this dependency a number of fixtures are necessary to make all the blades in one engine, since an engine has several different size and shaped blades. Another problem with using a blade dependent fixture is that during production, time may be wasted changing between fixtures, thus significantly limiting the number of blades that can be manufactured in a period of time.

Another possible way of providing references is by encapsulating the blank in a block of material, such as a low melt alloy. The block of material is formed around the blank, so that the root region extends from the block. The sides of the block provide reference planes from which the configuration of the dove tails or other details can be determined with the necessary accuracy. However, encapsulating the blank requires a complex encapsulation tool. In addition, a complex fixture is necessary to hold the block containing the blank during machining of the blank. Different encapsulation tools and holding fixtures are required for each differently shaped or sized blank. Furthermore, after machining the dove tails into the blank the material must be melted off the blank and must be disposed of without causing environmental problems.

Therefore, an improved method is sought for forming a precisely shaped part. The method should make use of a blank that provides references to accurately machine details into the blank. A fixture for use with the blank must be inexpensive to design and maintain, and easily modifiable to accommodate different size or shape blades.

SUMMARY

According to the present invention, a method for forming a precisely shaped part includes providing a blank having at least two spaced apart locators, providing a fixture having a U-shaped base with two spaced apart end walls, one supporting a clamping mechanism and the other supporting an abutment, securing the blank into the fixture such that the clamping mechanism mates with one of the locators and forces another of the locators into contact with the abutment, and subsequently machining the blank.

The locators on the blank are shaped to mate with corresponding features on the fixture, such that the fixture uses the locators to secure the blank. The locators are disposed in a plane from which critical design features are referenced. Once the blank is clamped into the fixture details can be accurately machined into the blank forming a precisely shaped part.

Using locators that are integral with the blank and disposed at the ends of the blank facilitates the use of a fixture that is less complex and easier to manufacture than the fixtures used in the prior art methods. This method also facilitates automation of the machining process. Furthermore, the fixture can be easily modified to accommodate different size or shaped blanks by making one of the end walls movable.

In further accordance with the present invention, the blank may include a tip at one end, a root region longitudinally spaced therefrom, a sacrificial region extending longitudinally from the root region, and a plane. The blank includes a plurality of locators disposed within the plane, a first one of the locators being disposed at the tip and a second one of the locators being disposed within the sacrificial region.

In one embodiment, the plane contains a stacking axis of the blank, the first locator is a bore, the clamping mechanism is a conical pin, and the second locator is a notch. The first locator may alternatively be a protrusion such as a conical one, and the clamping mechanism may employ a conical bore.

In further accordance with the present invention, the blank may include a second plane and a third locator disposed at the end of the sacrificial region. The second plane contains the root centerline. The third locator is a prismatic notch having a corner that is aligned with the second plane. This allows an even less complex fixture to be used.

In further accordance with the present invention, the base of the fixture may include a platform disposed thereon, and an ejector for lifting the blank from the platform. The platform allows proper loading of the blank into the fixture with minimum operator manipulation.

BRIEF DESCRIPTION OF THE DRAWINGS

FIG. 3 is a perspective view of a blank not yet in its final configuration.

FIG. 4 is a perspective view of a staging fixture for use in machining the blank of FIG. 3 into its final configuration for use in practicing the best mode embodiment of the method of the present invention.

FIG. 9 is a perspective view of the blank and the fixture of FIG. 8 where the blank is resting on the fixture and the fixture is in an open position.

FIG. 10 is a perspective view of the blank and the fixture of FIG. 8 where the blank is secured within the fixture and one side of a root region on the blank has been machined.

BEST MODE FOR CARRYING OUT THE INVENTION

Figure 1:
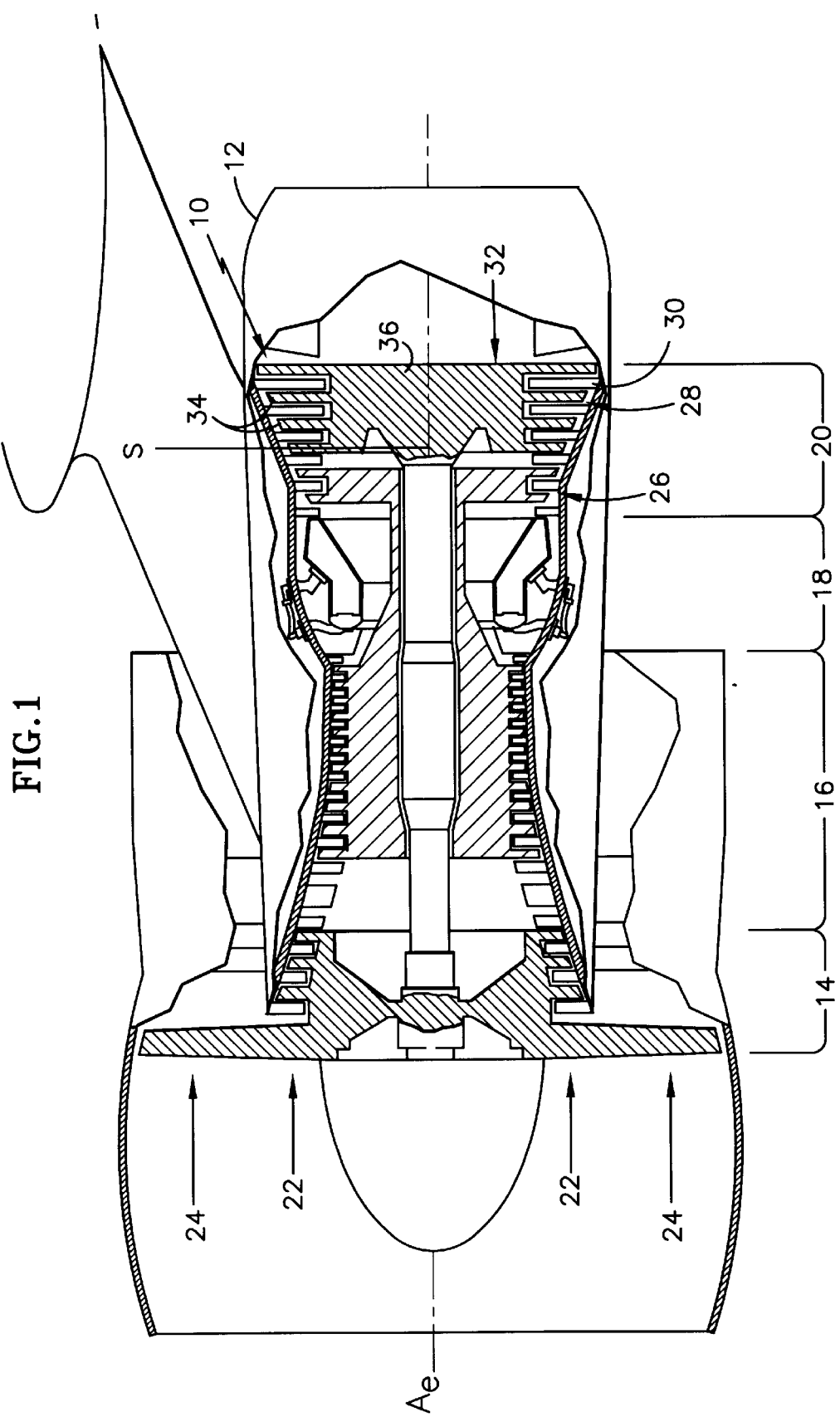
FIG. 1 is a side elevation schematic representation of an axial flow, turbofan gas turbine engine.

Referring to FIG. 1, an axial flow, turbofan gas turbine engine 10 is mounted in an aircraft nacelle 12. The nacelle 12 circumscribes the gas turbine engine 10. The engine comprises of a fan section 14, a compressor section 16, a combustor section 18, and a turbine section 20. An axis $A_e$ is centrally disposed within the engine, extending longitudinal therethrough. A primary flow path 22 for working medium gases extends longitudinally along the axis $A_e$. A secondary flow path 24 for working medium gases extends parallel to and radially outward of the primary flow path 22.

The turbine section 20 includes an upstream high pressure turbine 26 and a downstream low pressure turbine 28. For example, the low pressure turbine 28 is formed by a stator assembly 30 and a rotor assembly 32. The rotor assembly 32 has a plurality of airfoils or blades 34 which extend radially outward from a rotor disk 36 across the primary working medium flow path 22. Each blade 34 is characterized by a stacking axis S which extends perpendicular to the engine axis $A_e$.

Figure 2:
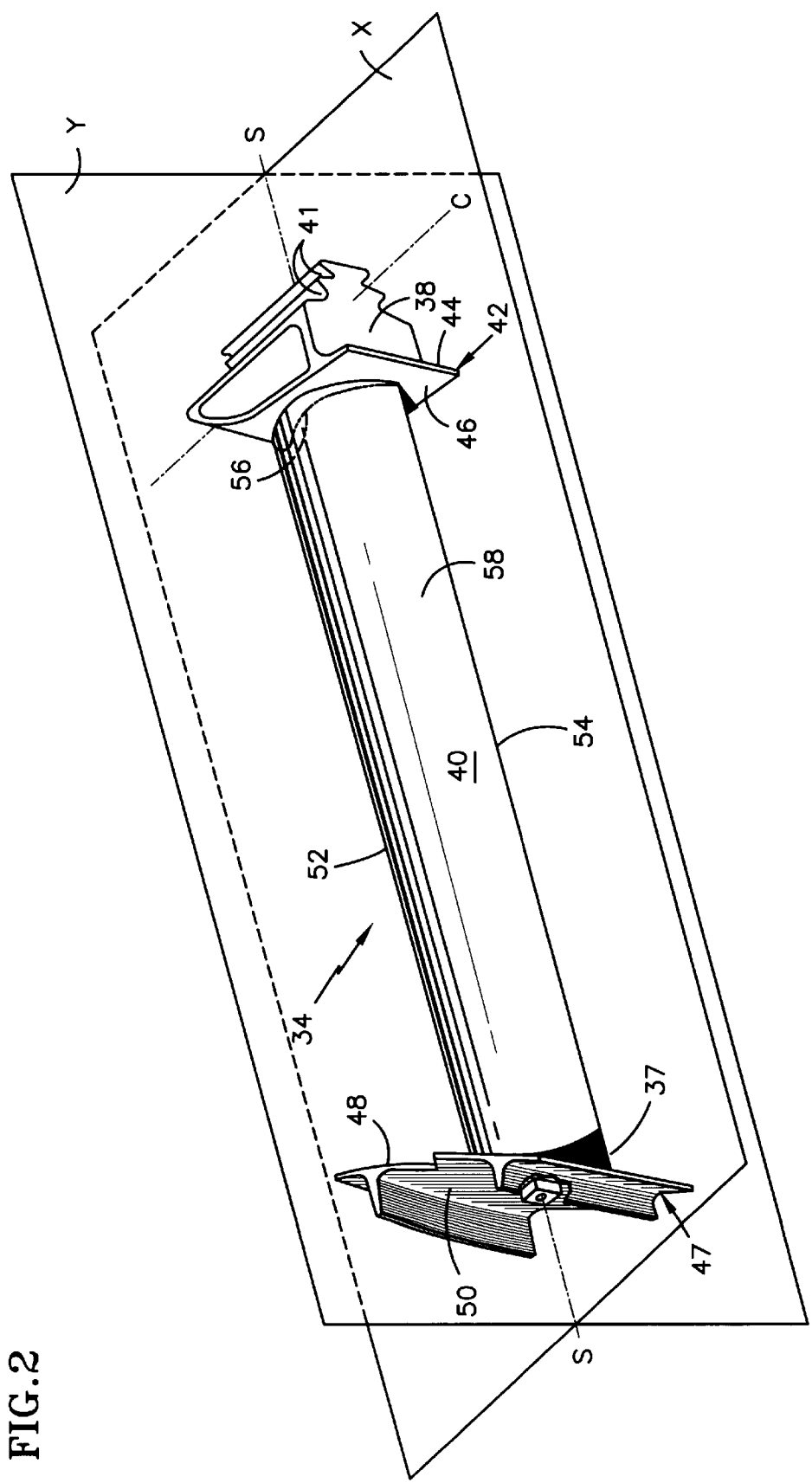
FIG. 2 is a perspective view of a turbine blade created by machining a blank according to a best mode embodiment of the method of the present invention.

Referring to FIG. 2 the turbine blade 34 generally has a tip 37, a root region 38 longitudinally spaced from the tip 37, and a midspan region 40 extending therebetween. A platform 42 separates the midspan region 40 from the root region 38. The platform 42 has an inner surface 44 adjacent the root region 38 and an opposed outer surface 46. The tip 37 further includes an integral shroud 47. The shroud 47 has an inner surface 48 adjacent the midspan region 40, and an opposed outer surface 50. The root region 38 includes a plurality of dove tails 41 which engage with mating grooves in the rotor disk 36 (as shown in FIG. 1). The root region 38 further includes a root centerline C disposed centrally through the width of the root region 38. The midspan region includes a leading edge 52, a trailing edge 54 spaced from the leading edge, pressure surface 56, and a suction surface 58. The pressure and suction surfaces 56 and 58 extend between the leading and trailing edges 52 and 54.

The turbine blade 34 is further characterized by first and second planes Y and X, respectively. The first plane Y contains the stacking axis S. The second plane X contains the root centerline C. The first plane Y is perpendicular to the second plane X. Critical dimensions of the blade are referenced from the first and second planes.

Referring to FIG. 3, a starting blank 60 from which the turbine blade 34 (as shown in FIG. 2) is formed (as by investment casting or the like) includes a protrusion 61, and a sacrificial region 62. The protrusion 61 extends from the radially outer surface 50 of the shroud 47 and is disposed on the stacking axis S. The sacrificial region 62 extends substantially longitudinally from the root region 38 (shown in phantom). The sacrificial region 62 includes a first surface 63, a second surface 64 spaced from the first surface 63, and a third surface 65 extending between the first and second surfaces 63 and 64, respectively.

Referring to FIG. 4, an indexing fixture 66 comprises a U-shaped structure with first and second end walls 68 and 70. The indexing fixture 66 allows the blank 60 (as shown in FIG. 3) to be accurately positioned within an electron discharge machine (not shown), by locating the blank 60 relative to six points. Each end wall 68 and 70 includes an outer surface 68a and 70a, and an upper surface 68b and 70b, respectively. The outer surface 68a of the first end wall includes a spherical first pin 72. The upper surface 68b of the first end wall includes a spherical second pin 73 and a cylindrical third pin 74. The upper surface 70b of the second end wall includes a spherical fourth pin 76, a spherical fifth pin 78, and a cylindrical sixth pin 79.

Referring to FIGS. 3 and 4, during production the starting blank 60 is placed on the indexing fixture 66 within a conventional wire electron discharge machine. The starting blank 60 rests on the indexing fixture 66, so that the pressure surface 56 of the starting blank 60 contacts the spherical second, fourth, and fifth pins 73, 76, and 78, respectively. In addition, the leading edge 52 contacts the cylindrical third and sixth pins 74 and 79, respectively; and the inner surface 48 of the shroud 47 contacts the first pin 72. The starting blank 60 is machined while it is positioned on the indexing fixture 66 to form a blank 80 (FIG. 5).

Figure 5:
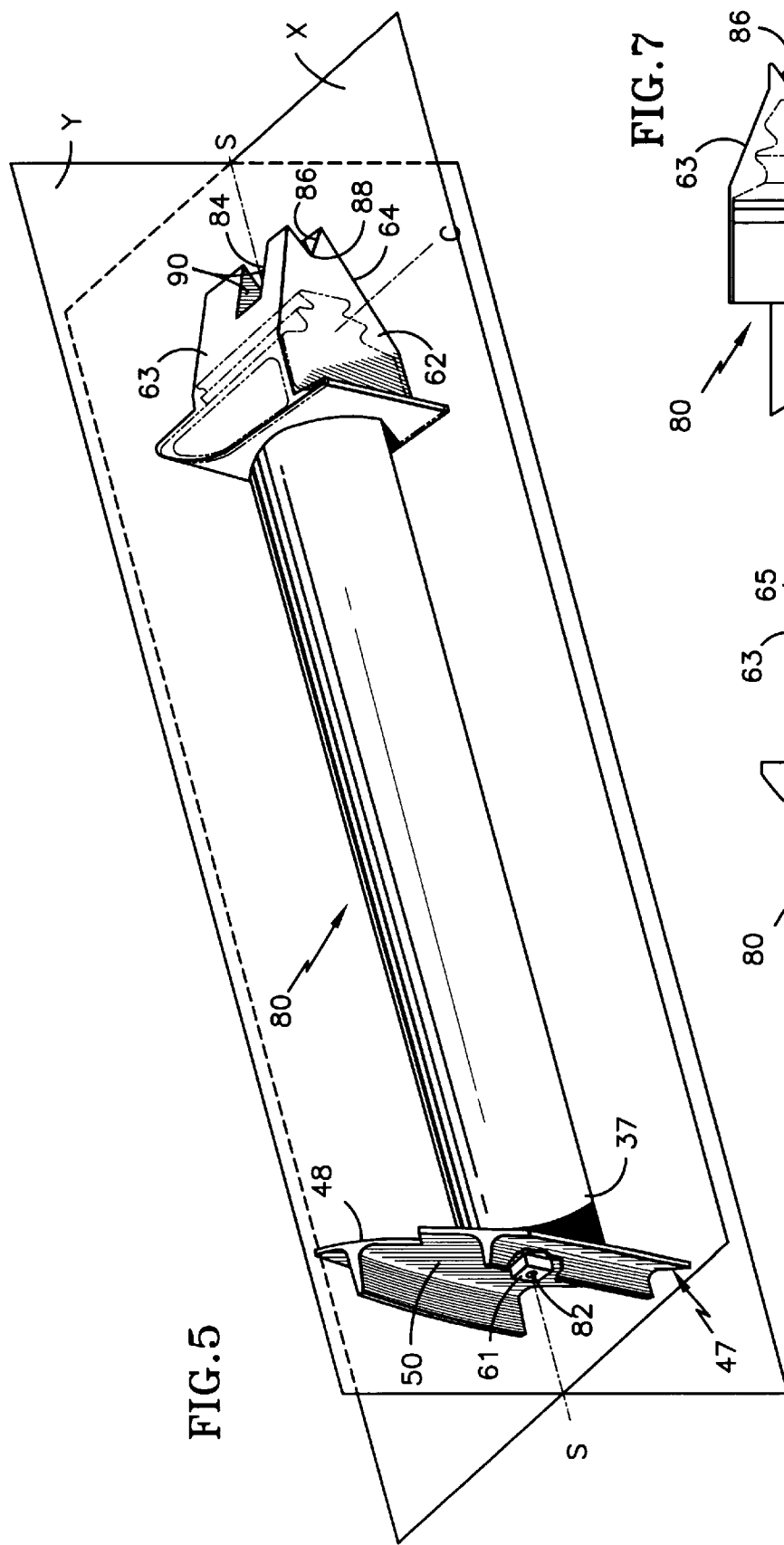
FIG. 5 is a perspective view of one embodiment of the blank used in practicing the best mode embodiment of the method of the present invention.
Figure 7:
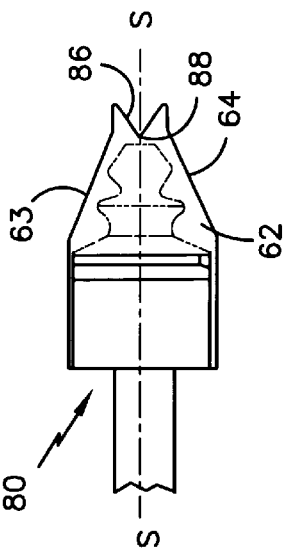
FIG. 7 is a partial top view of a portion of the embodiment of the blank shown in FIG. 5.

Referring to FIG. 5, the blank 80 has first, second, and third locators 82, 84, and 86, respectively. The first locator 82, in this embodiment, is a bore drilled into the protrusion 61 using rotary electron discharge machining. The first locator is disposed within the first plane Y along the stacking axis S.

Figure 6:
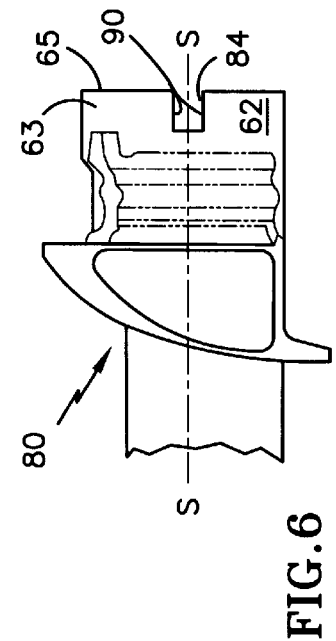
FIG. 6 is a partial front view of a portion of the embodiment of the blank shown in FIG. 5.

The second and third locators 84 and 86, are machined into the starting blank 60 (as shown in FIG. 3) using wire electron discharge machining. The second locator 84, in this embodiment, is a notch. Referring to FIGS. 5 and 6, the second locator 84 extends from the first surface 63 to the second surface 64 of the sacrificial region 62. In this embodiment, the second locator 84 is a rectangular notch including vertical surfaces 90. The vertical surfaces 90 are equally spaced from the stacking axis S.

The third locator 86, is a notch; in this embodiment, the notch 86, is cut from the third edge 65 (as shown in FIG. 3) of the sacrificial region 62. The third locator 86 preferably, has a feature that is parallel to the root centerline C. Referring to FIG. 5, the third locator 86 is shaped like a triangular prism with a corner 88 that is intersected by the stacking axis S and parallel to the centerline of the root region C.

Figure 8:
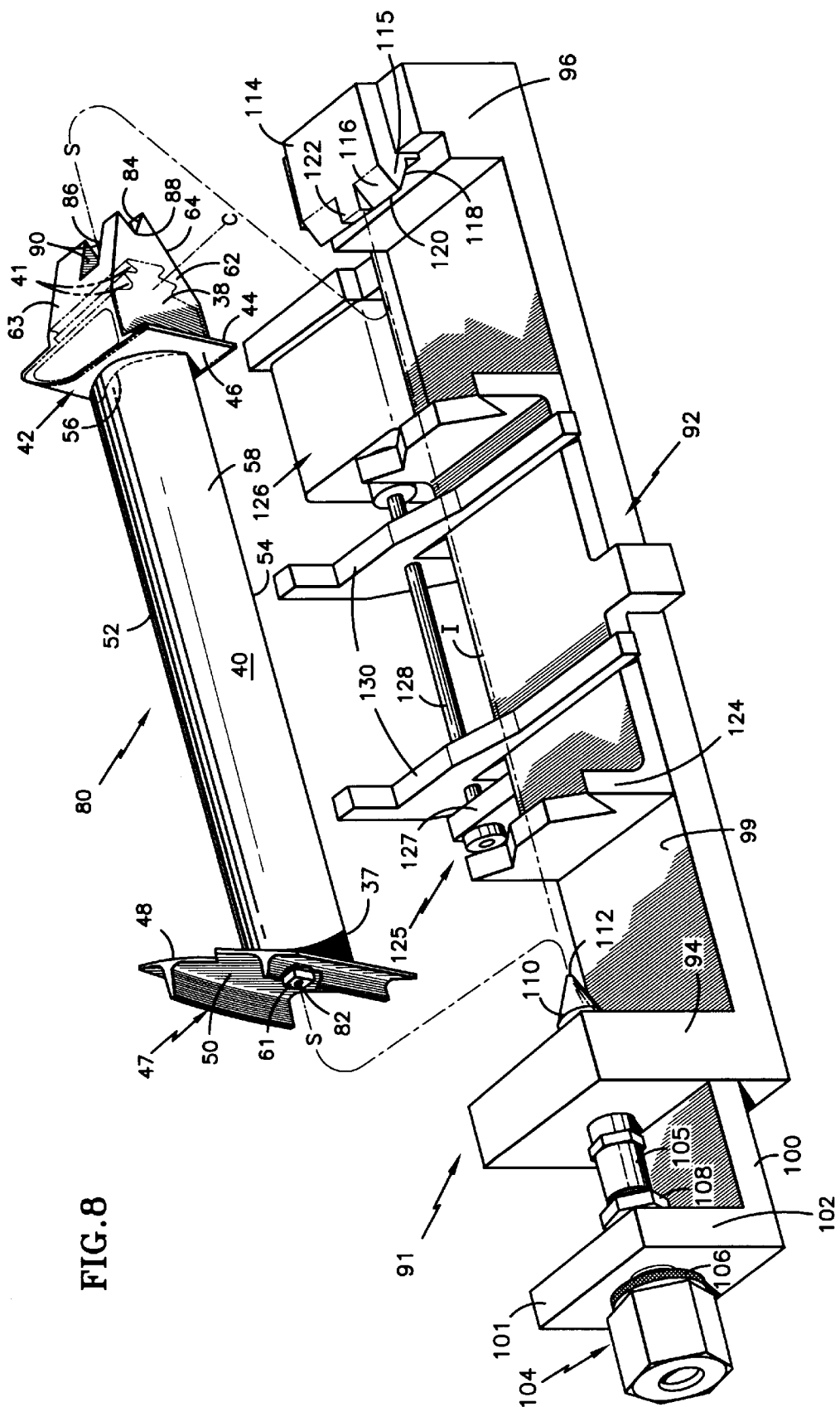
FIG. 8 is a perspective view of an embodiment of a fixture for use along with the blank of FIG. 5 in practicing the best mode embodiment of the method of the present invention.

Referring to FIG. 8, a fixture 91 for holding the blank 80 during subsequent machining includes an integral U-shaped base 92 with first and second end walls 94 and 96 spaced apart to accommodate blank 80 therebetween. The base 92 has an upper surface 99. The fixture 91 further includes an L-shaped wall structure 100 extending from the outer surface of the first end wall 94. The L-shaped wall structure 100 includes a vertical wall 102. Both the base 92 and the L-shaped wall structure support a clamping mechanism 104.

The clamping mechanism 104 includes a movable shaft 105, which extends through the vertical wall 102 and the first end wall 94. The movable shaft 105 supports the other elements of the clamping mechanism 104. The clamping mechanism 104 further includes an adjustment knob 106, a locking nut 108, and a conical pin 110. The adjustment knob 106 attaches to one end of the shaft 105, so that the shaft 105 turns as the knob 106 is turned. The locking nut 108 is threaded onto the shaft 105 between the vertical wall 102 and the first end wall 94. The locking nut 108 prevents undesired shaft rotation, when it is threaded into engagement with the wall 102. The conical pin 110 attaches to the other end of the shaft 105. The conical pin 110 extends through the first end wall 94. The conical pin 110 has a tip 112.

The fixture further includes an abutment 114 which attaches to the second end wall 96. The abutment 114 preferably includes a wedge shaped projection 115. The wedge projection 115 includes upper and lower surfaces 116 and 118, which join to form an edge 120. The angle between the upper and lower surfaces 116 and 118 of the wedge projection 115 allows the wedge to register with the third notch 86 of the blank 80. The upper surface 116 includes a rectangular projection 122 shaped to mate with the first notch 84 of the blank 80. The tip 112 of the conical pin 110 and the edge 120 of the wedge projection 115 form an insertion axis I that is parallel to the upper surface 99 of the base 92, and the projection 122 lies on the insertion axis I, so that the width of the projection 122 is equally divided on either side of the insertion axis I.

The base 92 may further include a platform 124 and an ejector 125. The platform 124 is disposed upon the upper surface 99 of the base of the fixture. The platform 124 is shaped so that upon placing the blank upon the platform, the stacking axis S of the blank and the insertion axis I of the fixture are substantially aligned. The ejector 125 includes a rotating means 126, a support means 127, a shaft 128 extending from the rotating means 126 and the support means 127. The shaft is engaged with the rotating means and the support means, so that the rotating means rotates the shaft. The ejector further includes two spaced arms 130 attached to the shaft 128.

The fixture 91 attaches to the support surface within a grinding machine (not shown) using conventional methods. Referring to FIG. 9, with the fixture 91 in the open position, the blank 80 is placed between the end walls 94 and 96 of the fixture 91, so that the stacking axis S and the insertion axis I are aligned. Thus positioned, the adjustment knob 104 is actuated so that the tip 112 of the conical pin moves along the insertion axis toward the second end wall 96. Referring to FIG. 10, the clamping mechanism is fully engaged with the blank when the tip 112 of the conical pin has fully engaged the first locator 82, the corner 88 of the third locator 86 mates with the edge 120 of the wedge projection 115, and the second locator 84 mates with the projection 122. Then, the locking mechanism 108 is engaged with the wall 102 to ensure the location of the blank does not change. In this position the stacking axis S of the blank 80 is aligned with the insertion axis I of the fixture.

The third locator 86 in combination with the wedge projection 115 ensures that the blank will not rotate during machining. The positioning of the wedge projection 115 and the conical pin 112 ensures that the insertion axis I and consequently the stacking axis of the blank once held will be parallel to the upper surface 99 of the base of the fixture, and located at a predetermined height. The second locator 84, the first locator 82, the conical pin 110, and the projection 122 ensure that the blank will not move widthwise. Where the blank does not include the third locator 86, the fixture must have components for ensuring that the stacking axis of the blank is parallel to the upper surface 99 at a predetermined height and that the blank will not rotate. Since this makes the fixture more complex, it is preferred that the blank have three locators and the fixture have the conical pin 110, projection 115, and the projection 122.

Figure 11:
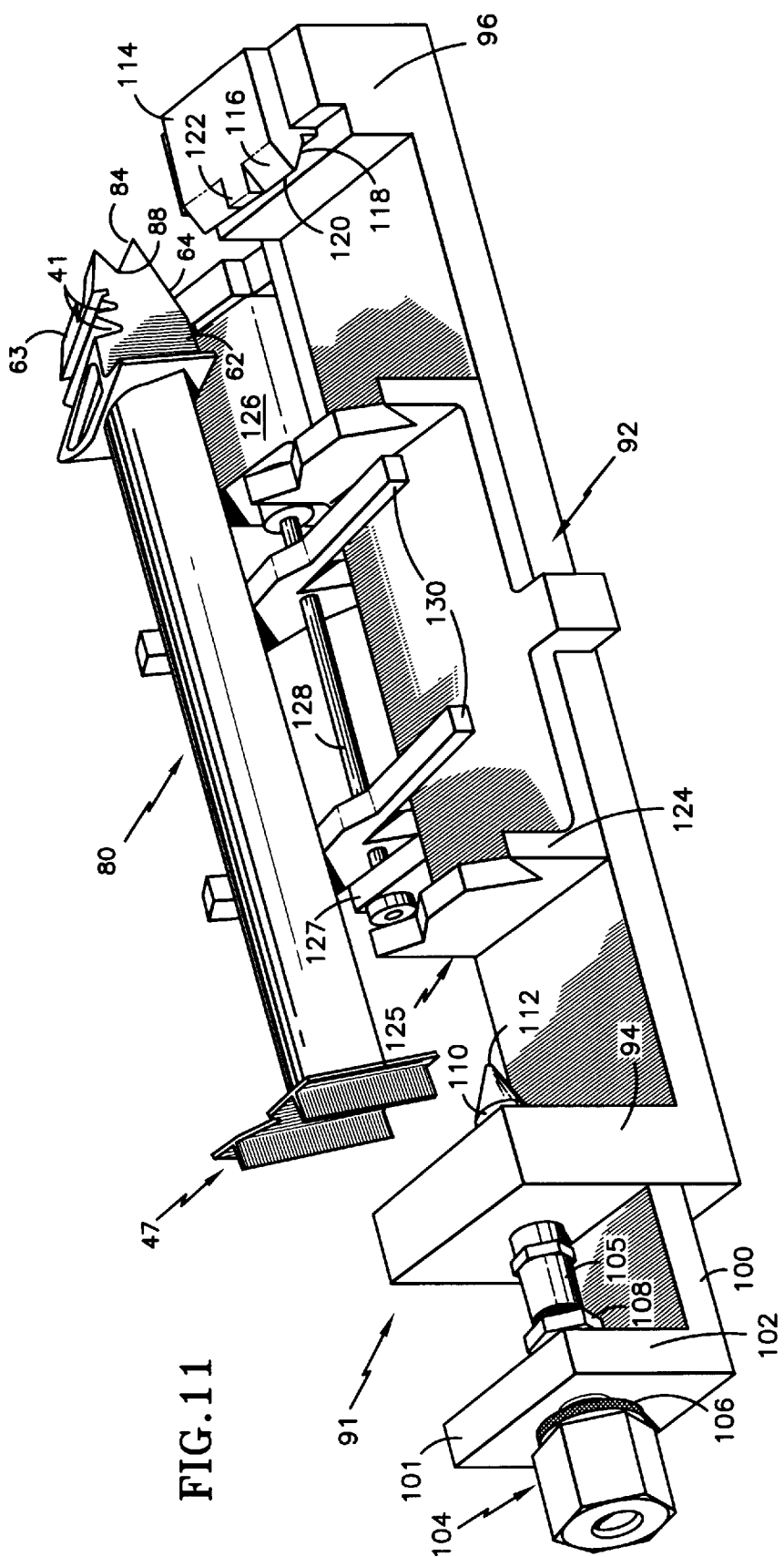
FIG. 11 is a perspective view of the blank and the fixture of FIG. 8 where the blank is being removed from the fixture by an ejector.

With the blade fixedly held in the clamping fixture, the dove tails 41 (as shown in phantom) can be ground into the first surface 63 of the sacrificial region 62 using conventional grinding machine operation techniques. Since the fixture holds the blank along two planes from which critical dimensions are referenced, it is preferable to use a programmable grinding machine with the fixture. Referring to FIG. 11, once these dove tails are completed, the conical pin 110 is disengaged from the blank 80 and the ejector 126 is automatically activated. The rotating means 126 causes the shaft 128 to rotate and consequently, the arms lift the blade out of the platform 124. Then, the blank 80 is rotated and placed in a similar fixture so that the second surface 64 is facing upward. Thus positioned, additional dove tails can be ground into the second surface 64 of the sacrificial region 62. After this operation, additional features can be ground into the blank, such as notches in the shroud or platform. Then the sacrificial region 62 is removed, thus removing the second and third locators 84 and 86. The protrusion 61 may then be machined off of the outer surface 50 of the shroud 47.

The principal advantage of the present invention is that it allows the part to be machined with improved accuracy. This is due to having the locators integral to the blade, locating the locators within the blank on planes from which the critical dimensions are measured, and using the fixture which uses these locators directly. Thus, the blade can be more accurately machined.

Another advantage of the present invention is that it allows a simple fixture to be used during machining of details to form a precisely shaped part. Since the references for machining the details are integral with the blank, and can be used to clamp the blade by the ends, the same fixture can be used with a variety of different length parts by modifying the distance between the end walls. Furthermore, the shape of the blade's midspan can change without requiring a different fixture; thus, eliminating the need for a different fixture for each part number. This eliminates the associated costs and delay of designing and building a fixture for each length part. The locators provide firm engagement with the fixture and therefore simple and economical fixture clamps are sufficient to position and hold the blank. This eliminates the need for fixtures with complex clamping mechanisms. It also eliminates downtimes during production associated with changing fixtures from one part length to another.

Yet another advantage is that manufacturing turbine blades no longer requires the use of encapsulation with low melt alloy, thus eliminating the time needed to encapsulate and the expensive to design and maintain encapsulation tools, fixturing tools, and melting machines. Furthermore it eliminates the need to dispose of the low melt alloy.

Yet another advantage of the present invention is the clamping fixture is easy and inexpensive to design and manufacture, and allows clamping of the part in close proximity to the ends of the blank. Clamping the part in close proximity to the ends of the blank allows the clamping fixture to hold the part in close proximity to where the grinding of the root will take place. This results in less deflection during grinding thus lower losses of precision, and allows the clamping forces necessary to hold the blank in the fixture to be low.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. The blank can be modified by changing the geometry of the first locator from a bore to other suitable features including a notch or a protrusion. The base of the fixture need not be intregal and one of the end walls can be slidably mounted thereto in order to vary the distance between the end walls, so that different length blades may be accommodated. Furthermore, the platform and the ejector allow the process to utilize automated clamping with little operator interaction, however these features are optional. If a protrusion such as a conical one is used instead of a bore as the first locator, the conical pin of the fixture would have to be modified to include, for example, a conical bore to receive the conical protrusion. In addition, placement of the locators may be changed, so that the same or another design reference axises or planes are used instead of the stacking axis or the root centerline, and the fixture may be modified to compliment the blank. Furthermore the locators can be machined features or as-cast, which would save processing time. It is therefore contemplated that the appended claims will cover any such modifications or embodiments that fall within the true scope of the invention.

We claim:

1. A method for forming a precisely shaped part, said method comprising the steps of:

providing a blank having a first locator and a second locator spaced therefrom;

providing a fixture having a base with end walls being spaced apart to accommodate said blank therebetween, said fixture further having a clamping mechanism for holding said blank, said clamping mechanism being supported by one of said end walls, and further including an abutment being supported by the other end wall;

securing said blank into said fixture wherein said clamping mechanism mates with said first locator and forces said second locator into contact with said abutment; and machining said blank while said blank is fixedly retained in said fixture by said clamping mechanism and said abutment.

2. The method of claim 1 wherein said second locator is longitudinally spaced from said first locator.

3. The method of claim 1, wherein the first locator has a conical shape.

4. The method of claim 1, wherein the first locator is a projection.

5. The method of claim 1, wherein the second locator is a notch.

6. The method of claim 1, wherein the fixture further comprises a platform and the method further comprises a step of placing said blank on said platform.

7. A method for use in forming a precisely shaped part, said method comprising the steps of:

providing a blank having a first locator and a second locator spaced therefrom, wherein the second locator has a prismatic shape;

providing a fixture having a base with end walls being spaced apart to accommodate said blank therebetween, said fixture further having a clamping mechanism for holding said blank, said clamping mechanism being supported by one of said end walls, and further including an abutment being supported by the other end wall; and securing said blank into said fixture wherein said clamping mechanism mates with said first locator and forces said second locator into contact with said abutment to fixedly retain said blank within said fixture for subsequent machining operations.

8. The method of claim 1 wherein said second locator is longitudinally spaced from said first locator, said first locator is a conical shape projection, and said second locator is a prismatic shape notch.

9. The method of claim 8 further comprising machining said blank while secured into said fixture.

10. The method of claim 7 further comprising machining said blank while secured into said fixture.

* * * * *

UNITED STATES PATENT AND TRADEMARK OFFICE
CERTIFICATE OF CORRECTION

PATENT NO. : 6,186,867 B1
DATED : February 13, 2001
INVENTOR(S) : James P. Dwyer It is certified that error appears in the above-identified patent and that said Letters Patent is hereby corrected as shown below:

Column 8, claim 9,
Line 53, delete "8" and substitute -- 7 --.

Signed and Sealed this

Twenty-third Day of October, 2001

Attest:

NICHOLAS P. GODICI
Attesting Officer  Acting Director of the United States Patent and Trademark Office